United States Patent Office 3,239,577
Patented Mar. 8, 1966

3,239,577
HYDROCARBON CONVERSION PROCESS
Herman S. Bloch, Skokie, George R. Donaldson, Barrington, and Vladimir Haensel, Hinsdale, Ill., assignors to Universal Oil Products Company, Des Plaines, Ill., a corporation of Delaware
No Drawing. Filed Oct. 23, 1964, Ser. No. 406,173
5 Claims. (Cl. 260—683.47)

This application is a continuation-in-part of my copending application Serial No. 307,364, filed September 9, 1963, now abandoned.

This invention relates to the preparation of branched chain paraffin hydrocarbons containing at least 5 carbon atoms per molecule.

An object of this invention is to provide a novel hydrocarbon conversion process for preparing branched chain paraffin hydrocarbons containing at least 5 carbon atoms per molecule.

A further object of this invention is to provide a novel hydrocarbon conversion process for preparing a branched chain paraffin hydrocarbon containing at least 5 carbon atoms per molecule from a starting material comprising a paraffin hydrocarbon of at least 4 carbon atoms per molecule at very mild hydrocarbon conversion reaction conditions.

Production of highly-branched chain paraffin hydrocarbons having high anti-knock properties and therefore suitable for use in automotive and aviation fuels is of considerable importance in the petroleum refining industry. Furthermore, the introduction of automobile engines of high compression ratio has necessitated the utilization of high anti-knock fuels in these engines to obtain maximum horsepower output therefrom. Thus, the demand for higher and higher octane number fuels has led to the need for increased quantities of highly-branched chain paraffinic hydrocarbons of high anti-knock values. A convenient source of such highly-branched chain paraffinic hydrocarbons is the catalytic conversion of less highly-branched chain paraffinic hydrocarbons. For example, normal butane and normal pentane have been isomerized to isobutane and isopentane, respectively, by various prior art processes utilizing either liquid or vapor phase. However, it is well known in the art that cracking occurs along with isomerization, and that this cracking increases with increasing molecular weight of the hydrocarbon reactant. A process for the preparation of branched chain paraffin hydrocarbons containing at least 5 carbon atoms per molecule is particularly attractive when the starting material can be converted at very mild conversion conditions by means of a chain reaction type mechanism, hereinafter described in the example in detail, into a high anti-knock hydrocarbon fraction. It is therefore an objective of this invention to provide such a process which will yield the desired branched chain paraffin hydrocarbon containing at least 5 carbon atoms per molecule.

Prior art processes for the isomerization of saturated hydrocarbons have taught the utilization of various catalytic agents to accelerate the desired molecular rearrangement at the conditions selected. Ordinarily, the catalytic agents utilized have comprised metal halides such as aluminum chloride, aluminum bromide, etc., which were activated by addition of the respective hydrogen halide thereto. These catalytic agents are very active and effect high conversion per pass. However, this high activity is accompanied by many disadvantages. One of the greatest disadvantages is the fact that these catalytic materials not only accelerate isomerization reactions, but they also induce decomposition reactions. These decomposition reactions are particularly detrimental to the overall economics of an isomerization process since they cause a loss of a portion of the charging stock as well as increasing catalyst consumption by the reaction of fragmental material with the catalytic agent to form sludge-like materials. The process of the present invention overcomes these disadvantages by utilization of more recently developed catalysts, and thus, the use of this novel hydrocarbon conversion process along with these catalysts results in the attainment of a hydrocarbon conversion reaction in which a high octane branched chain paraffin hydrocarbon containing at least 5 carbon atoms per molecule is obtained.

One embodiment of this invention provides a process for the preparation of branched chain paraffin hydrocarbons containing at least 5 carbon atoms per molecule which comprises passing to a reaction zone containing a conversion catalyst at conversion conditions a paraffin hydrocarbon of at least 4 carbon atoms per molecule in admixture with not more than 0.05% by weight of halide promoter and not more than 3% by weight of olefin activator, contacting said catalyst with said admixture in the presence of isobutane, withdrawing from said reaction zone a reaction zone effluent, continuously recycling at least a portion of said effluent to said reaction zone for further contacting with said catalyst, and subsequently recovering the resultant product.

A further embodiment of this invention provides a process for the preparation of branched chain paraffin hydrocarbons containing at least 5 carbon atoms per molecule which comprises passing to a reaction zone containing a conversion catalyst comprising a refractory oxide, a platinum group metal and combined halogen at conversion conditions a paraffin hydrocarbon of at least 4 carbon atoms per molecule in admixture with not more than 0.05% by weight of halide promoter and not more than 3% by weight of olefin activator, contacting said catalyst with said admixture in the presence of isobutane, withdrawing from said reaction zone a reaction zone effluent, continuously recycling at least a portion of said effluent to said reaction zone for further contacting with said catalyst, and subsequently recovering the resultant product.

A specific embodiment of this invention provides a process for the preparation of isopentane which comprises passing to a reaction zone containing a conversion catalyst comprising a refractory metal oxide, a platinum group metal and combined halogen, isobutane in admixture with not more than 0.05% by weight of isopropyl chloride and not more than 3% by weight of propylene, contacting said catalyst at conversion conditions including a temperature of from about 0° to about 65° C. and a pressure of from about atmospheric to about 200 atmospheres with said admixture, withdrawing from said reaction zone a reaction zone effluent, continuously recycling at least a portion of said effluent to said reaction zone for further contacting with said catalyst, and subsequently recovering isopentane.

A still more specific embodiment of this invention provides a process for the preparation of isopentane which comprises passing to a reaction zone containing a conversion catalyst comprising alumina, platinum and from about 5% to about 20% by weight of aluminum chloride impregnated thereon at a temperature of from about 425° to about 625° C., isobutane in admixture with not more than 0.05% by weight of isopropyl chloride and not more than about 3% by weight of propylene, contacting said catalyst at conversion conditions including a temperature of from about 0° to about 65° C. and a pressure of from about atmospheric to about 200 atmospheres with said admixture in the presence of from about 0.25 to about 10 moles of hydrogen per mole of hydrocarbon, withdrawing from said reaction zone a reaction zone effluent, continuously recycling at least a portion of said effluent to said reaction zone for further contacting with said catalyst, and subsequently recovering isopentane.

The process of this invention is particularly applicable to the conversion of saturated hydrocarbons including both paraffins and cycloparaffins. Suitable paraffin hydrocarbons are those containing at least 4 carbon atoms per molecule including normal butane, isobutane, normal pentane, isopentane, normal hexane, 2-methylpentane, 3-methylpentane, normal heptane, 2-methylhexane, 3-methylhexane, normal octane, etc., and cycloparaffins such as the alkylcyclopentanes and cyclohexanes including methylcyclopentane, dimethylcyclopentane, cyclohexane, methylcyclohexane, dimethylcyclohexane, ethylcyclohexane, etc. The process is also applicable to the conversion of mixtures of paraffins such as those derived by fractionation of straight-run or natural gasolines, or in the raffinate produced by extraction of aromatics from a hydroformed naphtha. Aromatics are preferably absent from the feed stock to the present process, and it is preferred that the feed contain branched as well as normal paraffins.

We believe that under the conditions utilized and with the catalyst employed, a chain reaction mechanism occurs whereby, for example, from 2 to 4 isobutane molecules become involved per propylene molecule, as shown in the accompanying series of reactions in Table I which illustrate a specific embodiment of this invention. Underlined molecules are those which undergo net consumption or production; all other molecules or ions are assumed to be intermediate.

TABLE I (1) $\underline{i\text{-}C_3H_7Cl} + \underline{i\text{-}C_4H_{10}} \rightarrow t\text{-}C_4H_9^+ + Cl^- + \underline{C_3H_8}$
(2) $t\text{-}C_4H_9^+ + \underline{C_3H_6} \rightarrow C_7H_{15}^+$
(3) $C_7H_{15}^+ + \underline{i\text{-}C_4H_{10}} \rightarrow t\text{-}C_4H_9^+ + C_7H_{16}$
(4) $C_7H_{16}^+ \rightarrow C_2H_4 + \underline{i\text{-}C_5H_{12}}$
(5) $t\text{-}C_4H_9^+ + C_2H_4 \rightarrow C_6H_{13}^+$
(6) $C_6H_{13}^+ + \underline{i\text{-}C_4H_{10}} \rightarrow \underline{C_6H_{14}} + t\text{-}C_4H_9^+$

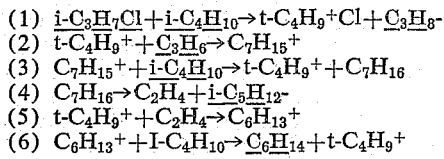

(7) $t\text{-}C_4H_9^+ + \underline{C_3H_6} \rightarrow C_7H_{15}^+$
(8) $C_7H_{15}^+ + \underline{C_3H_6} \rightarrow C_{10}H_{21}^+$
(9) $C_{10}H_{21}^+ + \underline{i\text{-}C_4H_{10}} \rightarrow C_{10}H_{22} + t\text{-}C_4H_9^+$
(10) $C_{10}H_{22} \rightarrow \underline{i\text{-}C_5H_{12}} + C_5H_{10}$
(11) $C_5H_{10} + t\text{-}C_4H_9^+ \rightarrow C_9H_{19}^+$
(12) $C_9H_{19}^+ + \underline{i\text{-}C_4H_{10}} \rightarrow C_9H_{20} + t\text{-}C_4H_9^+$
(13) $C_9H_{20} \rightarrow C_4H_8 + \underline{i\text{-}C_5H_{12}}$
(14) $t\text{-}C_4H_9^+ + C_4H_8 \rightarrow C_8H_{17}^+$
(15) $C_8H_{17}^+ + \underline{i\text{-}C_4H_{10}} \rightarrow C_8H_{18} + t\text{-}C_4H_9^+$
(16) $C_8H_{18} \rightarrow C_3H_6 + \underline{i\text{-}C_5H_{12}}$
(17) $t\text{-}C_4H_9^+ + C_3H_6 \rightarrow C_7H_{15}^+$
(18) $C_7H_{15}^+ + \underline{i\text{-}C_4H_{10}} \rightarrow C_7H_{16} + t\text{-}C_4H_9^+$
(19) $C_7H_{16} \rightarrow C_2H_4 + \underline{i\text{-}C_5H_{12}}$
(20) $C_2H_4 + t\text{-}C_4H_9^+ \rightarrow C_6H_{13}^+$
(21) $C_6H_{13}^+ + \underline{i\text{-}C_4H_{10}} \rightarrow t\text{-}C_4H_9^+ + \underline{C_6H_{14}}$

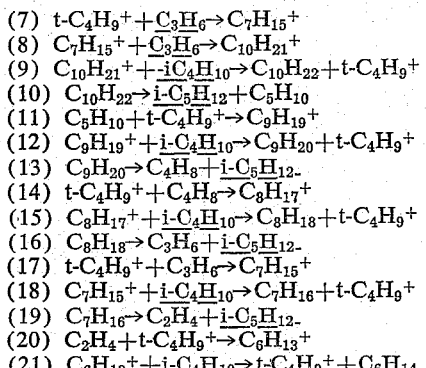

(22) Etc.—Repeat from (7) onward
Summary of Cycle (7)–(21) Inclusive:
(23) $2C_3H_6 + 5\,i\text{-}C_4H_{10} \rightarrow 4\,i\text{-}C_5H_{12} + C_6H_{14}$ In this series, the 15 reactions between the horizontal lines in Table I represent a cycle which may be summarized by the equation:

$$2C_3H_6 + 5\,i\text{-}C_4H_{10} \rightarrow 4\,i\text{-}C_5H_{12} + C_6H_{14}$$

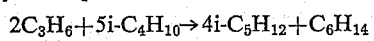

This particular cycle yields 433% by weight of liquid product based on the propylene charged. Other cycles could be written to show somewhat greater or somewhat lesser yields and to show the formation of other branched chain paraffin hydrocarbons containing at least 5 carbon atoms per molecule.

Various conversion catalysts are utilizable within the generally broad scope of the process of the present invention. These catalysts include a support, an acid-acting function, and a hydrogenation component. The support may be selected from various diverse refractory oxides including silica, alumina, silica-alumina, silica-alumina-magnesia, silica-alumina-zirconia, silica-zirconia, etc. Depending upon the method of preparation and upon the treatment of the support thereafter, these various supports will have surface areas ranging from about 25 to about 500 square meters per gram. In some of these supports, the acid-acting function is inherently present, as when silica-alumina is used as the support. The amount of effectiveness of this acid-acting function is then controlled by the quantity of silica which is combined with the alumina, and by the treatment of the silica-alumina, particularly by calcination, prior to or after compositing the hydrogenation component therewith. Of the various supports, alumina is preferred, and particularly gamma-alumina having a surface area of from about 150 to about 450 square meters per gram. When gamma-alumina is utilized as the support, the acid-acting function can be added to the catalyst by the incorporation therein of what is known in the art as combined halogen. The amount of combined halogen can be varied from about 0.01 to about 8% by weight based on the alumina. Of the various halogens which may be utilized, both fluorine and chlorine can be utilized satisfactorily. Thus, a suitable alumina-type catalyst to be utilized in the process of the present invention may comprise about 0.3% by weight of fluorine and about 0.3% by weight of chlorine incorporated therein. Another suitable catalyst for use in the process of the present invention would comprise an alumina-type catalyst where the combined halogen incorporated with the alumina support is fluorine, and this fluorine may be utilized in an amount of from about 2.5% to about 4.5% by weight. The composite will then have the desired hydrogenation component combined therewith as hereinafter described. This hydrogenation component will normally be selected from Groups VI(B) and VIII of the Peridoic Table or mixtures thereof. Such hydrogenation components include chromium, molybdenum, tungsten, iron, cobalt, nickel, and the so-called platinum group metals including platinum, palladium, ruthenium, rhodium, osmium, and iridium. Of the various hydrogenation components which may be utilized, those of the platinum group metals are preferred, and of these platinum group metals, platinum itself is particularly preferred. The hydrogenation component of the catalyst of the present invention will normally be utilized in an amount of from about 0.01% to about 10% by weight based on the weight of the support. With the preferred platinum group metals, particularly platinum, the quantity utilized will range from about 0.01% to about 2% by weight. One typical catalyst comprising platinum, combined halogen, and alumina for use in the process of this invention therefore will contain about 0.375% platinum, about 4.5% combined fluorine, and alumina.

Because of equilibrium conditions and because it is often desirable and/or advisable to carry out the conversion at the lowest possible reaction temperature, catalysts may also be prepared by impregnating composites such as hereinabove described with a metal halide of the Friedel-Crafts type at elevated temperatures. Various Friedel-Crafts metal halides may be utilized but not necessarily with equivalent results. Examples of such Friedel-Crafts metal halides include aluminum bromide, aluminum chloride, antimony pentachloride, beryllium chloride, ferric bromide, ferric chloride, gallium trichloride, stannic bromide, stannic chloride, titanium tetrabromide, titanium tetrachloride, zinc bromide, zinc chloride, and zirconium chloride. Of these Friedel-Crafts metal halides, the Friedel-Crafts aluminum halides are preferred, and aluminum chloride is particularly preferred. While the catalysts are prepared from Friedel-Crafts metal halides, they do not contain any free Friedel-Crafts metal halides as prior art catalysts of this general type have contained. During the preparation of these catalysts at elevated temperatures, the Friedel-Crafts metal halide appears to react with the refractory oxide and it is believed that the Friedel-Crafts metal halide reacts with the hydroxyl groups on the refractory oxide surface so that when the catalyst preparation is completed, the catalyst composite is free from Friedel-Crafts metal halide. For example, an excellent low-temperature conversion catalyst particularly preferred for use in the present invention can be prepared by impregnating from about 5 to about 20% aluminum chloride onto a composite of platinum, alumina, and combined halogen at temperatures of from about 425° C. to about 625° C. The final catalyst composite contains about 3–8% of combined chloride, is free from aluminum chloride, and is a particularly preferred conversion catalyst for preparing branched chain paraffin hydrocarbons containing at least 5 carbon atoms per molecule.

The feed to the reaction zone, namely the paraffin hydrocarbon of at least four carbon atoms per molecule, is passed in admixture with not more than 0.05% by weight of halide promoter that is selected to promote the desired conversion reaction and preferably with not more than 3% by weight of olefin activator which is designated to be a source of free radicals in the hydrocarbon conversion reaction and with branched chain paraffin hydrocarbon of four carbon atoms per molecule, namely, isobutane, that is passed to the reaction zone at the same time as the paraffin hydrocarbon feed. Concentrations of halide promoter greater than about 0.05% by weight (of the paraffin hydrocarbon containing at least 4 carbon atoms per molecule) are unnecessary, and, in fact, not desired inasmuch as the catalytic composites utilizable in the present invention do not require large amounts of halide promoter to maintain the activity of the catalytic composite nor do large amounts of halide insure the stability of the catalytic composite against undue aging. In fact, it is known that large amounts of halide promoter tend to detract from the catalytic activity of such catalysts and correspondingly, lower yields of product are obtained. Also, as hereinabove stated, the olefin activator utilized in the process of the present invention will not exceed 3% by weight of the paraffin hydrocarbon charge stock inasmuch as concentrations of olefin greater than about 3% would undergo hydrogenation and polymerization, thereby also contributing to rapid catalyst deactivation.

Suitable halide promoters utilizable in the present invention include alkyl halides including ethyl fluoride, n-propyl fluoride, isopropyl fluoride, n-butyl fluoride, isobutyl fluoride, sec-butyl fluoride, tert-butyl fluoride, etc., ethyl chloride, n-propyl chloride, isopropyl chloride, n-butyl chloride, isobutyl chloride, sec-butyl chloride, tert-butyl chloride, etc., ethyl bromide, n-propyl bromide, isopropyl bromide, n-butyl bromide, isobutyl bromide, sec-butyl bromide, tert-butyl bromide, etc. Suitable olefin activators utilizable in the present invention include propylene, 1-butene, 2-butene, isobutylene, and higher molecular weight normally liquid olefins such as the various pentenes, hexenes, heptenes, octenes, and mixtures thereof, and still higher molecular weight liquid olefins, the latter including various olefin polymers having from about 9 to about 18 carbon atoms per molecule including propylene trimer, propylene tetramer, propylene pentamer, etc. Cycloolefins such as cyclopentene, methylcyclopentene, cyclohexene, methylcyclohexene, etc. may also be utilized. Of the olefin activators for use in the process of this invention, propylene is particularly preferred.

The conversion process of the present invention is carried out at varying conditions of temperature, pressure and space velocity. The temperature utilized will generally be dictated by the particular catalyst selected. Thus, the temperature may range over a relatively wide range of from about 0° C. to about 200° C. although it is particularly preferred to operate the process of the present invention at mild operating temperatures of from about 0° C. to about 65° C. The higher temperatures are used especially if it is desired to effect the desired conversion reaction without an olefin activator or in a situation where very small amounts of olefin activator are utilized. The pressure will be selected so as to always insure at least a partial liquid phase in the reaction zone, and depending upon the particular temperature utilized, will range from about atmospheric pressure to about 200 atmospheres or more. Liquid hourly space velocities will range from about 0.1 to about 20 or more. Hydrogen is utilized to minimize cracking and to maintain the surface of the catalyst in a substantially carbon-free condition. The quantity of hydrogen utilized will range from about 0.25 to about 10 moles or more of hydrogen per mole of hydrocarbon. Hydrogen consumption will be exceedingly small, in the range of from about 30 to about 75 cubic feet per barrel of hydrocarbon feed.

The process of the present invention may be effected in any suitable manner and may comprise either a batch or a continuous type operation. A particularly preferred method of operation comprises a fixed bed-type operation where the conversion catalyst is disposed as a fixed bed within the reaction zone. Other continuous types of operation which may be used in this process include the compact moving bed-type of operation in which the bed of catalyst and the reactants pass either concurrently or countercurrently to each other in the reaction zone, and the slurry type operation in which the catalyst is carried into the reaction zone as a slurry in one of the reactants.

The following example is given to illustrate our invention but is not introduced with the purpose of unduly limiting the same.

*Example*

One specific example of the operation of the process with an alumina-platinum-combined halogen catalyst is described herewith. The catalyst comprises 0.375% by weight platinum on a calcined gamma-alumina support which has been impregnated at about 538° C. with aluminum chloride and thereafter swept with a stream of dry nitrogen at the same temperature to remove excess unreacted aluminum chloride so that the catalyst contains about 5% by weight total combined chloride.

A combined feed comprising 200 grams per hour of isobutane and 2 grams per hour of olefin activator, namely propylene, in admixture with not more than 0.05% by weight of halide promoter, namely 100 p.p.m. (0.01% by weight) of isopropyl chloride, is passed to the reaction zone containing the above-described catalyst. The reaction zone is maintained at about 25° C. and about 750 p.s.i.g. so as to insure at least a partial liquid phase in the reaction zone. The effluent liquid is collected in a receiver and after a sufficient quantity has accumulated, effluent from the receiver is recycled over the catalyst at a rate of about 2 gallons per hour, while excess effluent is discharged as product. There is formed from the above feed from 7 to 10 grams per hour of net liquid product comprising 55% pentanes (of which 77% are isopentane), 22% hexanes (of which 54% are neohexane and the remainder isomeric hexanes), 12% heptanes and about 11% octanes.

It is evident that this liquid product, which amounts to 350–500% by weight of the olefin feed, cannot be a simple propylene-isobutane alkylation product, but results from a series of reactions of the type discussed hereinabove.

We claim as our invention:

1. A process for the preparation of isopentane which comprises passing to a reaction zone containing a conversion catalyst comprising a refractory metal oxide, a platinum group metal and combined halogen, isobutane in admixture with not more than 0.05% by weight of isopropyl chloride and not more than 3% by weight of propylene, contacting said catalyst at conversion conditions including a temperature of from about 0° to about 65° C.

and a pressure of from about atmospheric to about 200 atmospheres with said admixture, withdrawing from said reaction zone a reaction zone effluent, continuously recycling at least a portion of said effluent to said reaction zone for further contacting with said catalyst, and subsequently recovering isopentane.

2. A process for the preparation of isopentane which comprises passing to a reaction zone containing a conversion catalyst comprising alumina, platinum and from about 5% to about 20% by weight of aluminum chloride impregnated thereon at a temperature of from about 425° to about 625° C., isobutane in admixture with not more than 0.05% by weight of isopropyl chloride and not more than about 3% by weight of propylene, contacting said catalyst at conversion conditions including a temperature of from about 0° to about 65° C. and a pressure of from about atmospheric to about 200 atmospheres with said admixture in the presence of from about 0.25 to about 10 moles of hydrogen per mole of hydrocarbon, withdrawing from said reaction zone a reaction zone effluent, continuously recycling at least a portion of said effluent to said reaction zone for further contacting with said catalyst, and subsequently recovering isopentane.

3. The process of claim 1 further characterized in that said conversion catalyst comprises alumina, from about 0.01 to about 2.0% by weight thereof of platinum, and from about 0.1 to about 8.0% by weight thereof of combined halogen.

4. The process of claim 1 further characterized in that said combined halogen is a mixture of chlorine and from about 0.3% to about 0.7% by weight of fluorine.

5. The process of claim 1 further characterized in that said combined halogen is fluorine in an amount of from about 2.5 to about 4.5% by weight.

References Cited by the Examiner

UNITED STATES PATENTS

| 2,425,268 | 8/1947 | Sensel | 260—683.75 |
| 2,908,735 | 10/1959 | Haensel | 260—683.68 |
| 2,972,649 | 2/1961 | Thomas et al. | 260—683.53 |

PAUL M. COUGHLAN, *Primary Examiner.*

ALPHONSO D. SULLIVAN, DELBERT E. GANTZ,
*Examiners.*